US008939095B2

(12) United States Patent
Freed

(10) Patent No.: US 8,939,095 B2
(45) Date of Patent: Jan. 27, 2015

(54) FURROW CLOSING ASSEMBLY AND METHOD

(71) Applicant: Brian Freed, Lexington, IL (US)

(72) Inventor: Brian Freed, Lexington, IL (US)

( * ) Notice: Subject to any disclaimer, the term of this patent is extended or adjusted under 35 U.S.C. 154(b) by 0 days.

(21) Appl. No.: 13/767,874

(22) Filed: Feb. 14, 2013

(65) Prior Publication Data

US 2013/0206431 A1 Aug. 15, 2013

Related U.S. Application Data

(60) Provisional application No. 61/598,678, filed on Feb. 14, 2012.

(51) Int. Cl.
*A01B 49/02* (2006.01)
*A01C 5/06* (2006.01)

(52) U.S. Cl.
CPC ............... *A01B 49/027* (2013.01); *A01C 5/068* (2013.01); *A01C 5/064* (2013.01); *Y10S 111/926* (2013.01)
USPC ........... 111/193; 111/194; 111/164; 111/167; 111/926; 111/200; 172/2

(58) Field of Classification Search
CPC .... A01B 49/00; A01B 49/025; A01B 49/027; A01B 49/04; A01C 7/00; A01C 7/16; A01C 5/06; A01C 5/062; A01C 5/064; A01C 5/066
USPC .................. 172/558–566, 606, 610, 4, 2, 12; 111/129, 186, 187, 189, 190–194, 157, 111/163–165, 167, 134–137, 52, 59, 62, 111/926, 200
See application file for complete search history.

(56) References Cited

U.S. PATENT DOCUMENTS

| 3,742,877 | A |   | 7/1973 | Coffee |
| 3,749,035 | A | * | 7/1973 | Cayton et al. ................. 111/187 |
| 4,258,635 | A |   | 3/1981 | Lutz et al. |
| 4,398,478 | A | * | 8/1983 | Frase et al. .................... 111/196 |
| 4,425,857 | A |   | 1/1984 | Lienemann et al. |
| 4,461,355 | A | * | 7/1984 | Peterson et al. .............. 172/156 |

(Continued)

OTHER PUBLICATIONS

Exapta Soluntions, Inc., The Thompson Wheel, internet web page, 2013.

(Continued)

*Primary Examiner* — Thomas B Will
*Assistant Examiner* — Jessica H Lutz
(74) *Attorney, Agent, or Firm* — Thompson & Thompson, P.A.; Jeffrey L. Thompson

(57) ABSTRACT

Agricultural planter row units feature soil finishing assemblies for closing a seed groove after seed is placed in the soil. An adjustable furrow closing assembly enhances upper seed groove coverage and closure with soil resulting in sustained relative humidity levels and optimum seed-to-soil contact for faster seed germination. The furrow closing assembly includes a closing wheel assembly having at least one closing wheel and a press wheel assembly having a press wheel following behind the closing wheels. The closing wheels and press wheel are attached to the planter row unit in a manner allowing the press wheel to move vertically relative to the closing wheels. Adjustable down-force systems are provided to vary the down force applied to the closing wheels and the press wheel to maintain optimum soil contact in irregular terrain and in varying soil densities and conditions to provide optimum soil coverage and compaction of the seed bed.

35 Claims, 14 Drawing Sheets

(56) References Cited

U.S. PATENT DOCUMENTS

| | | | |
|---|---|---|---|
| 4,539,921 A * | 9/1985 | Morlock ......................... 111/52 |
| 4,550,122 A | 10/1985 | David et al. |
| 4,633,791 A * | 1/1987 | Lindstrom et al. ............ 111/152 |
| 4,750,441 A * | 6/1988 | Pfenninger et al. ........... 111/135 |
| 4,785,890 A | 11/1988 | Martin |
| 4,920,901 A * | 5/1990 | Pounds ......................... 111/164 |
| 4,964,351 A * | 10/1990 | Elmenhorst ................... 111/140 |
| 5,129,282 A | 7/1992 | Bassett et al. |
| 5,181,476 A | 1/1993 | Rau et al. |
| 5,190,112 A | 3/1993 | Johnston et al. |
| 5,341,754 A | 8/1994 | Winterton |
| 5,346,020 A | 9/1994 | Bassett |
| 5,349,911 A | 9/1994 | Holst et al. |
| 5,398,625 A * | 3/1995 | Johnson et al. ............... 111/189 |
| 5,398,771 A * | 3/1995 | Hornung et al. ............... 172/311 |
| 5,497,717 A | 3/1996 | Martin |
| 5,626,196 A * | 5/1997 | Hughes ......................... 172/558 |
| D382,571 S | 8/1997 | Bruns |
| 5,752,453 A | 5/1998 | Nikkel et al. |
| D396,863 S | 8/1998 | Bruns |
| 5,896,932 A | 4/1999 | Bruns et al. |
| D412,711 S | 8/1999 | Bruns |
| 5,974,986 A * | 11/1999 | Trisler ............................ 111/69 |
| 6,003,454 A * | 12/1999 | Ozers et al. ................... 111/184 |
| D421,026 S | 2/2000 | Bruns et al. |
| 6,067,918 A | 5/2000 | Kirby |
| 6,068,061 A * | 5/2000 | Smith et al. ................... 172/139 |
| 6,148,747 A * | 11/2000 | Deckler et al. ................ 111/137 |
| 6,216,616 B1 * | 4/2001 | Bourgault ..................... 111/186 |
| 6,314,897 B1 | 11/2001 | Hagny |
| 6,454,019 B1 * | 9/2002 | Prairie et al. .................. 172/677 |
| 6,530,334 B2 * | 3/2003 | Hagny .......................... 111/189 |
| 6,681,868 B2 | 1/2004 | Kovach et al. |
| 6,688,245 B2 * | 2/2004 | Juptner ......................... 111/200 |
| 6,761,120 B2 * | 7/2004 | Kovach et al. ................. 111/140 |
| 6,871,709 B2 | 3/2005 | Knobloch et al. |
| 6,978,727 B2 * | 12/2005 | Geddes ......................... 111/167 |
| D519,526 S | 4/2006 | Bowsher |
| 7,065,945 B2 * | 6/2006 | Hurtis ........................... 56/249.5 |
| 7,156,186 B2 * | 1/2007 | Knobloch et al. ............. 172/701 |
| 7,222,575 B2 | 5/2007 | Bassett |
| 7,240,627 B1 | 7/2007 | Whalen et al. |
| 7,308,859 B2 | 12/2007 | Wendte et al. |
| 7,594,546 B2 * | 9/2009 | Ankenman ..................... 172/540 |
| D611,507 S | 3/2010 | Martin |
| 7,681,656 B2 * | 3/2010 | Jagow et al. ................... 172/538 |
| 7,757,777 B1 | 7/2010 | Wipf et al. |
| D621,421 S | 8/2010 | Falk |
| 7,832,345 B2 | 11/2010 | Whalen et al. |
| 7,861,660 B2 | 1/2011 | Martin |
| 7,975,629 B1 | 7/2011 | Martin |
| 7,980,186 B2 | 7/2011 | Henry |
| 7,984,768 B2 * | 7/2011 | Schilling ....................... 172/566 |
| 7,997,217 B2 * | 8/2011 | Stark et al. .................... 111/52 |
| 8,146,519 B2 * | 4/2012 | Bassett ......................... 111/119 |
| 8,448,587 B2 * | 5/2013 | Kowalchuk .................. 111/200 |
| 8,479,669 B2 * | 7/2013 | Shoup ........................... 111/139 |
| 8,763,713 B2 * | 7/2014 | Bassett ......................... 172/2 |
| 8,813,662 B2 * | 8/2014 | Martin .......................... 111/62 |
| 2009/0007828 A1 * | 1/2009 | Johnson ........................ 111/79 |
| 2010/0116185 A1 * | 5/2010 | Keaton et al. ................. 111/200 |
| 2011/0226167 A1 * | 9/2011 | Schilling et al. .............. 111/154 |
| 2013/0233088 A1 * | 9/2013 | Noble et al. ................... 73/861 |

OTHER PUBLICATIONS

John Deere, Planting Equipment, Row-unit attachments, p. 39, 2013.
Case-IH Electronic Parts Catalog, Manual:(1210)—Rigid Mounted Planter Early Riser Series (July, 2008), 2013.
The Martin-Till Planting System, www.martintill.com, 2013.

* cited by examiner

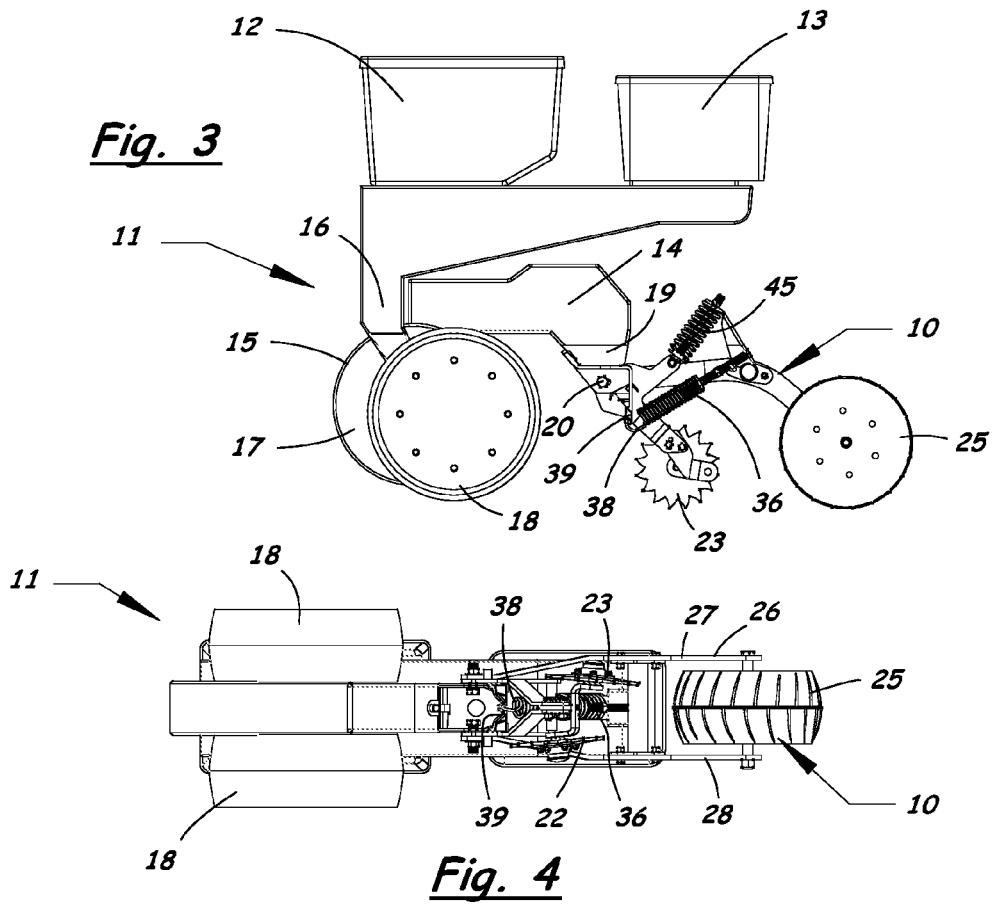
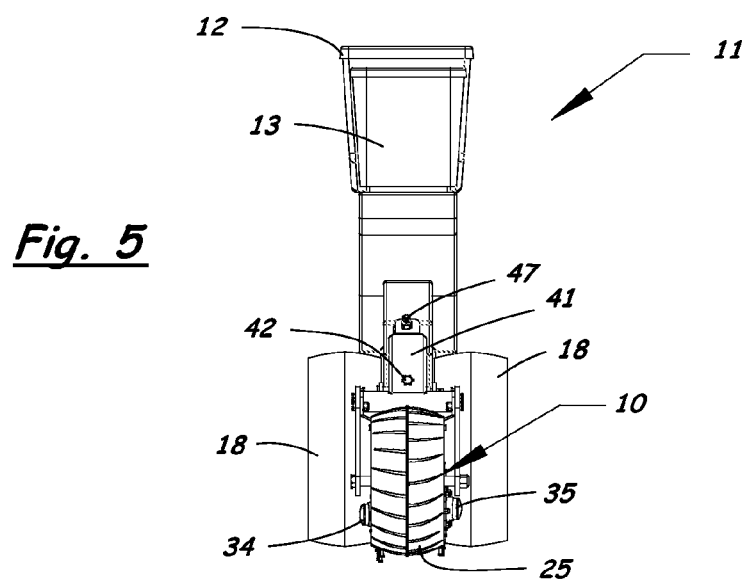

FURROW CLOSING ASSEMBLY AND METHOD

RELATED APPLICATIONS

This application claims priority of U.S. Provisional Application No. 61/598,678 filed on Feb. 14, 2012. The entire content of this prior application is incorporated herein by reference.

BACKGROUND OF THE INVENTION

1. Field of the Invention

This invention relates generally to agricultural planters and planter row units, and is particularly directed to the combination of a pair of seed furrow closing wheels and a soil press wheel capable of independent operation for improved soil contact.

2. Description of the Related Art

Agricultural planters form a furrow in the ground, deposit seed in the furrow, and then cover the seed with soil. The mechanism for covering the seed with soil is generally referred to as a furrow closing assembly.

A variety of furrow closing assemblies are known in the prior art. For example, furrow closing assemblies are commercially available that are designed to be pivotally attached to pivot pins located at the rear end of planter row units manufactured by John Deere and Kinze. Such furrow closing assemblies include, for example: (1) a pair of press wheels that roll on each side of the furrow and pinch the furrow closed, (2) a drag system that pulls loose soil into the furrow, and (3) a pair of closing discs that direct soil back into the furrow.

Another furrow closing system designed to be used on John Deere planter row units includes a pair of closing discs followed by a press wheel. However, the press wheel and closing discs in this furrow closing system are not moveable independent of each other, and therefore do not provide consistent soil contact. In uneven terrain, the press wheel will sometimes free wheel because it is not in firm contact with the soil.

Another furrow closing system comprising a pair of closing discs followed by a press wheel has been disclosed by Case-IH for its Model 1200 planters. However, the press wheel and closing discs in this furrow closing system are attached to separate points on the planter row unit and are not suitable for use with other existing planters, such as John Deere and Kinze planters. Moreover, the down-force systems on these furrow closing systems are not adjustable remotely to adapt the furrow closing system to different soil conditions.

There is a need in the industry for an improved furrow closing system for agricultural planters.

SUMMARY OF THE INVENTION

Objects of the present invention are to provide a furrow closing system that fits existing agricultural planters, that is easy to install, that has independent suspension for more consistent soil contact, that avoids free wheel spin of the press wheel assembly, that provides furrow closing conditions that encourage fast and even seed emergence, that provides more complete seed furrow closure, that minimizes sidewall compaction, and that results in higher crop yields.

Further objects of the present invention are to provide a furrow closing assembly having a down-force system that can be adjusted remotely to change the amount of down force acting on the press wheel and the down force acting on the closing wheels.

To accomplish these and other objects, the present invention provides a combination of a leading soil closing wheel assembly for filling a furrow in which are deposited seeds, and a trailing press wheel for pressing the furrow covering soil downward. The closing wheel assembly is pivotal relative to the press wheel assembly to allow relative vertical movement between the closing wheels and the press wheel during operation. The downward pressures applied to the closing wheels and to the press wheel are independently adjustable depending upon such variables as soil conditions and terrain topography to insure optimum soil contact. A first down-force system is used to transfer down force from the planter row unit subframe to the furrow closing assembly, and a second down-force system is used to transfer down force between the closing wheels and the press wheel of the furrow closing assembly. The down-force systems can be adjustable remotely using in-cab controls during planting. Various embodiments are provided that allow the furrow closing assembly to be attached to existing agricultural planters.

According to one aspect of the present invention, a furrow closing assembly is provided for use with agricultural planters having individual row units, each row unit having a row unit subframe with a pair of pivot pins protruding laterally outwardly from opposite sides of the subframe near a rear end thereof, the furrow closing assembly comprising: a closing wheel rotatably attached to a closing wheel arm assembly and adapted to move soil into a furrow behind the row unit subframe; a press wheel rotatably attached to a press wheel arm assembly and adapted to roll over a soil surface behind the closing wheel; a front portion of the furrow closing assembly pivotally mounted to the pivot pins for allowing the furrow closing assembly to pivot about a generally horizontal axis relative to the row unit subframe; and the press wheel arm assembly and the closing wheel arm assembly being pivotal relative to each other to allow relative vertical movement between the closing wheel and the press wheel during operation.

According to another aspect of the present invention, a furrow closing assembly for use with agricultural planters is provided, comprising: a press wheel arm assembly having a front end adapted to be pivotally attached to a pair of pivot pins on a planter row unit subframe for pivotal movement about a transverse axis of rotation; a press wheel rotatably attached to a rear end of the press wheel arm assembly and arranged to roll over a soil surface behind the planter row unit subframe; a closing wheel arm assembly having a front end adapted to be pivotally attached to the pair of pivot pins; and at least one closing wheel rotatably attached to the closing wheel arm assembly, the closing wheel being arranged to move soil into a furrow in front of the press wheel.

According to another aspect of the present invention, a planter row unit for an agricultural seeder is provided, comprising: a row unit subframe having a front portion, a rear portion and a pair of pivot pins protruding laterally outwardly from opposite sides of the rear portion; a furrow opener mounted to the front portion of the subframe for creating a furrow in which seeds can be deposited; and a furrow closing assembly pivotally mounted to the pivot pins to pivot about a generally horizontal axis relative to subframe. The furrow closing assembly includes: at least one closing wheel rotatably attached to a closing wheel arm assembly and adapted to move soil into the furrow created by the furrow opener; a press wheel rotatably attached to a press wheel arm assembly and adapted to roll over a soil surface behind the closing wheel; and the press wheel arm assembly and the closing wheel arm assembly being pivotal relative to each other to allow relative vertical movement between the closing wheel and the press wheel during operation.

According to another aspect of the present invention, a planter row unit for an agricultural seeder is provided, comprising: a row unit subframe; a furrow opener mounted to the subframe for creating a furrow in which seeds can be deposited; and a furrow closing assembly pivotally mounted to the subframe. The furrow closing assembly includes: at least one closing wheel rotatably attached to a closing wheel arm assembly and adapted to move soil into the furrow created by the furrow opener; a press wheel rotatably attached to a press wheel arm assembly and adapted to roll over a soil surface behind the closing wheel; the press wheel arm assembly and the closing wheel arm assembly being moveable relative to each other to allow relative vertical movement between the closing wheel and the press wheel during operation; a first down-force system arranged between the subframe and a point on the furrow closing assembly for biasing the furrow closing assembly in a downward direction; a second down-force system arranged between the press wheel arm assembly and the closing wheel arm assembly for transferring down force between the press wheel and the closing wheel; and a means for adjusting at least one of the first and second down-force systems remotely to change an amount of down force imparted thereby.

According to another aspect of the present invention, a method of closing a furrow during agricultural planting is provided, comprising: providing a planter row unit having a furrow closing assembly with at least one closing wheel followed by a rolling press wheel; and adjusting a down force imparted to the rolling press wheel and/or the closing wheel from a remote location during a planting operation.

Numerous other objects of the present invention will be apparent to those skilled in this art from the following description wherein there is shown and described example embodiments of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 3 is a side elevation view of the planter row unit shown in FIG. 1, with the furrow closing assembly shown with a partial cutaway section;

FIG. 4 is a bottom view of the planter row unit shown in FIG. 1;

FIG. 5 is a rear view of the planter row unit shown in FIG. 1;

DETAILED DESCRIPTION OF THE INVENTION

Furrow closing assemblies for planter row units according to embodiments of the present invention will now be described in detail with reference to FIGS. 1 to 27 of the accompanying drawings.

Figure 1:
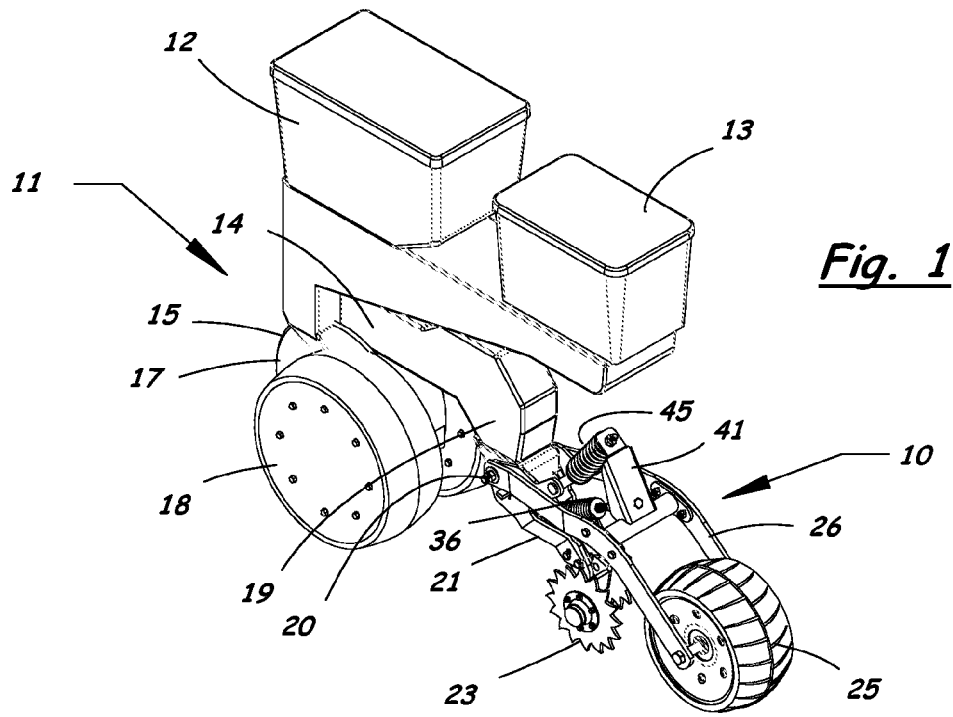
FIG. 1 is an isometric view of a planter row unit equipped with a furrow closing assembly according to a first embodiment of the present invention.
Figure 2:
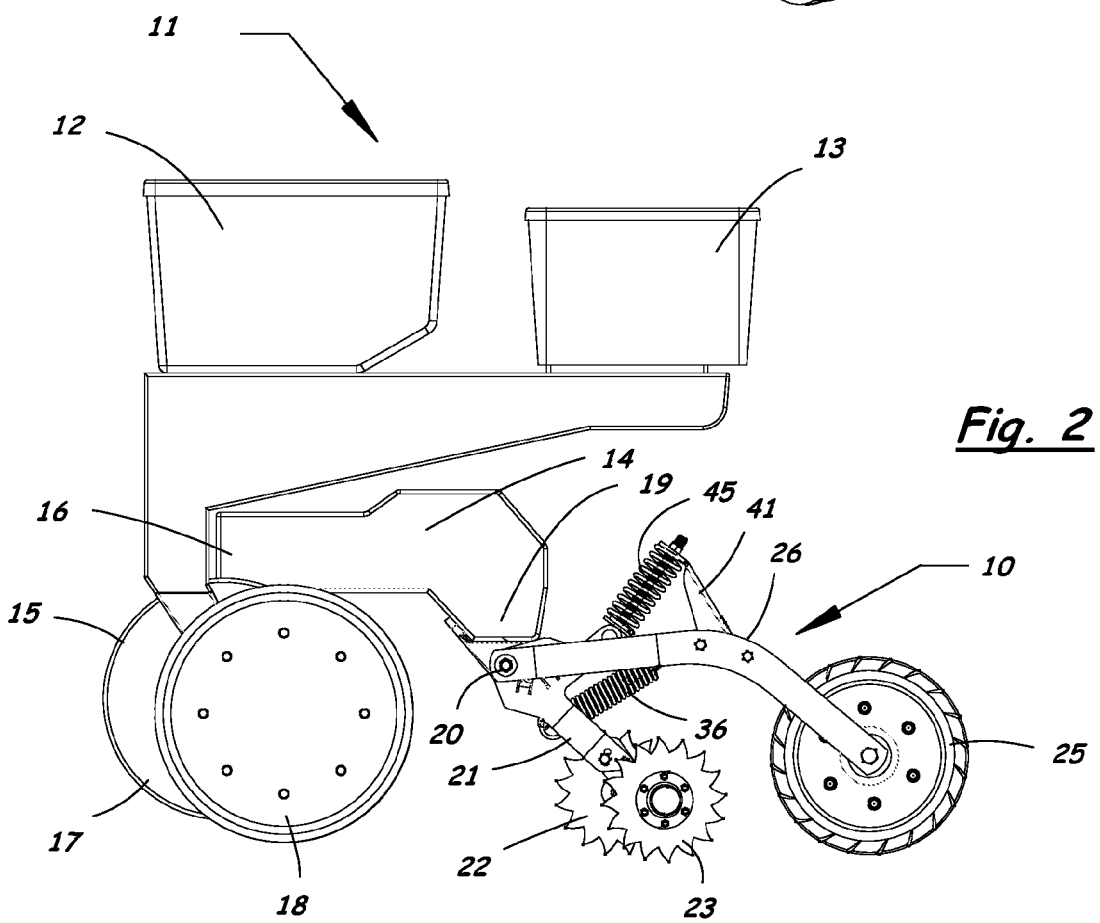
FIG. 2 is a side elevation view of the planter row unit shown in FIG. 1.
Figure 6:
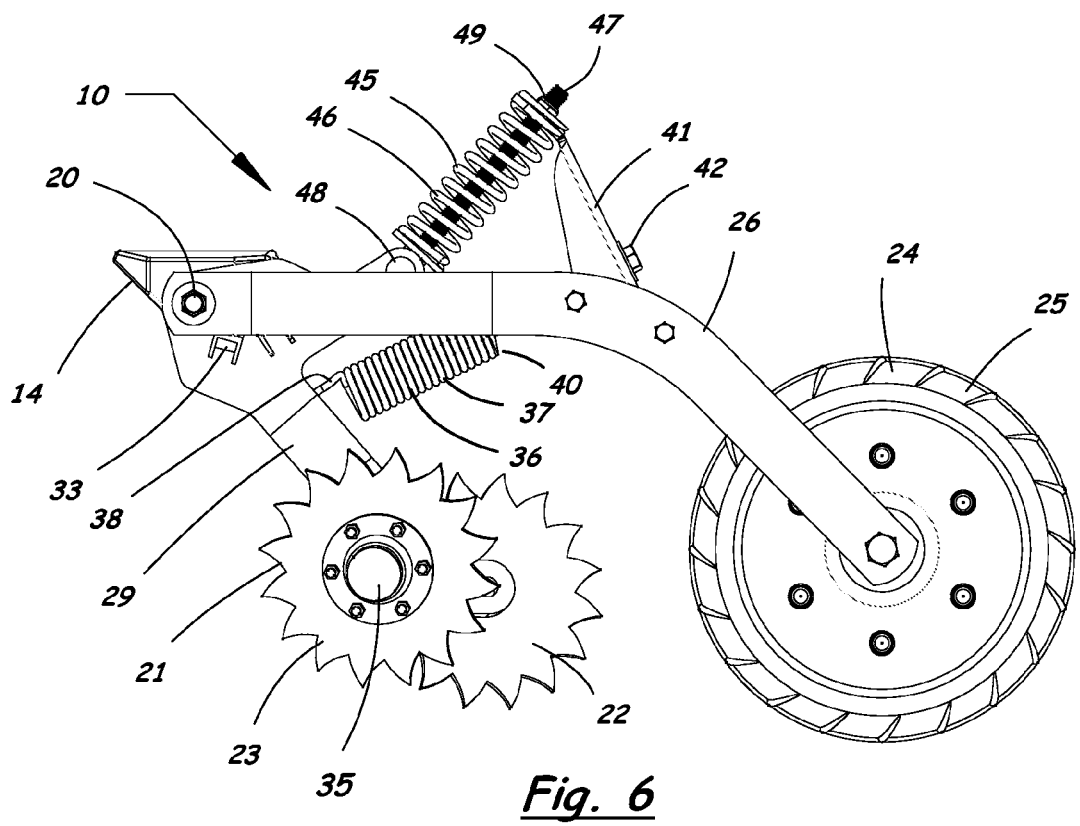
FIG. 6 is a side elevation view of the furrow closing assembly according to the first embodiment of the present invention.
Figure 7:
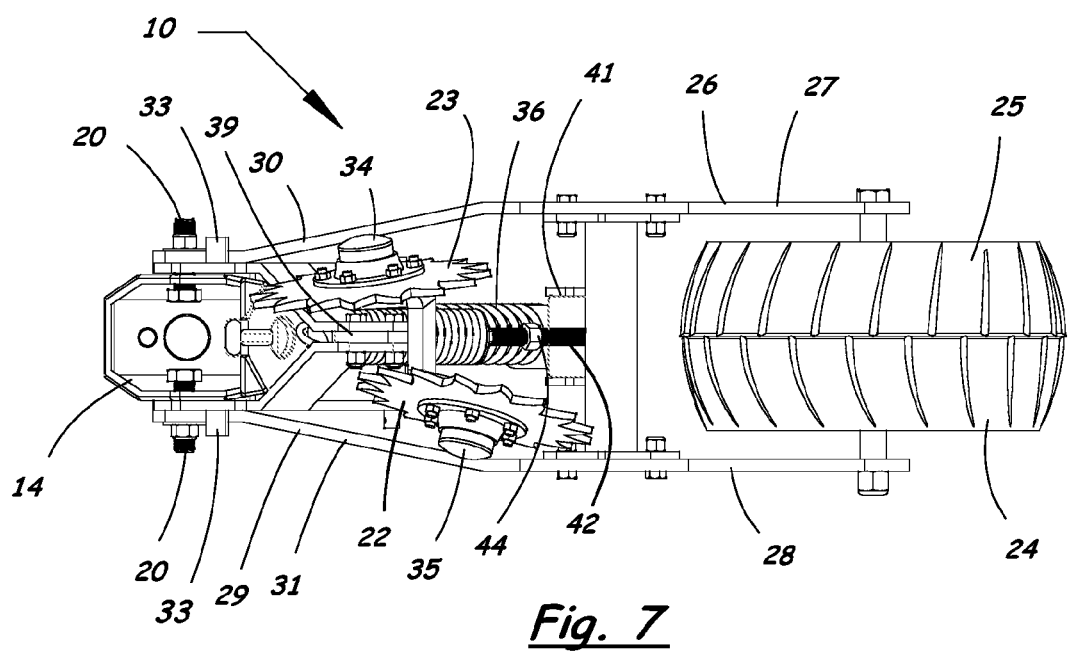
FIG. 7 is a bottom view of the furrow closing assembly shown in FIG. 6.
Figure 8:
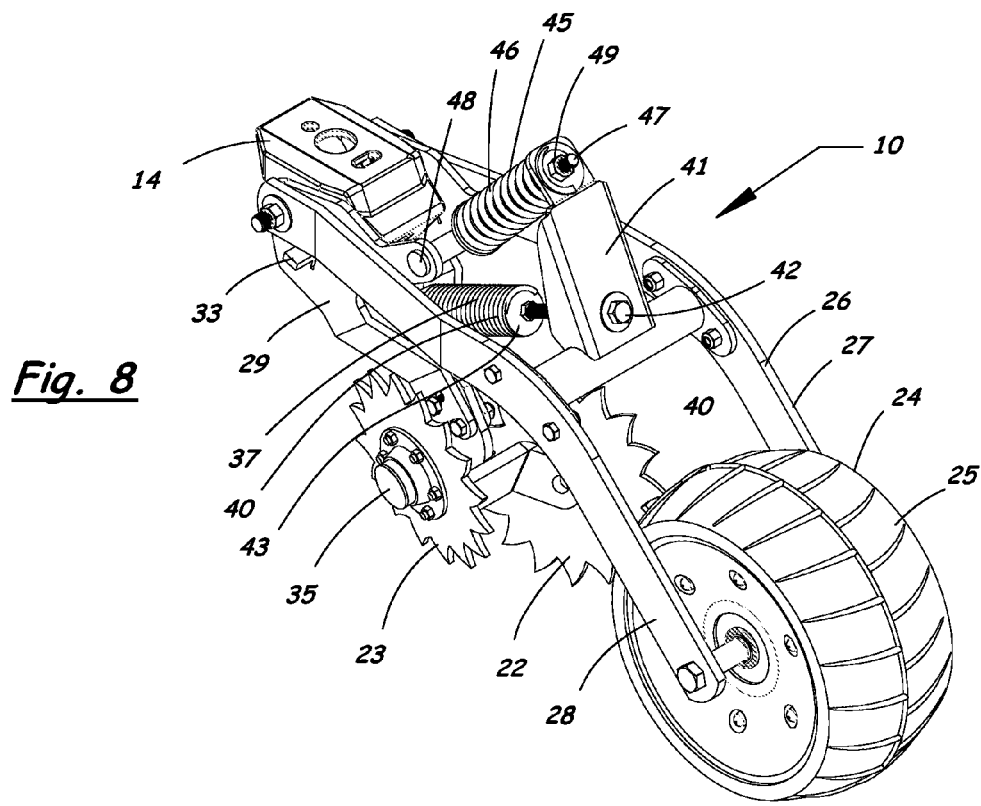
FIG. 8 is an isometric view of the furrow closing assembly shown in FIG. 6.
Figure 9:
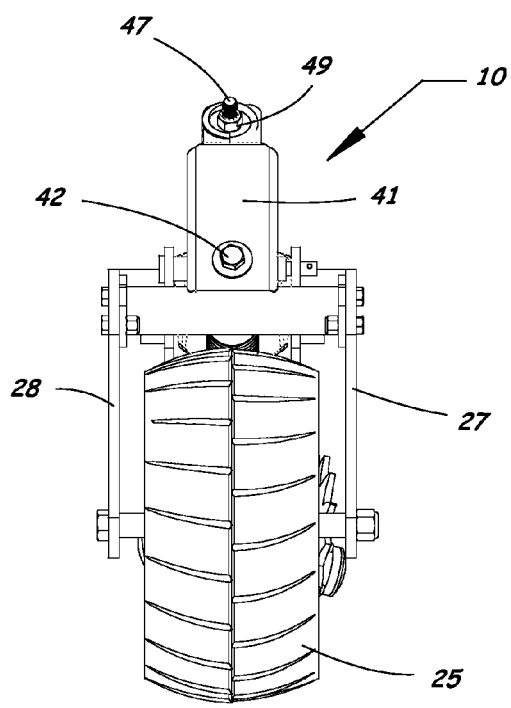
FIG. 9 is a rear view of the furrow closing assembly shown in FIG. 6.
Figure 10:
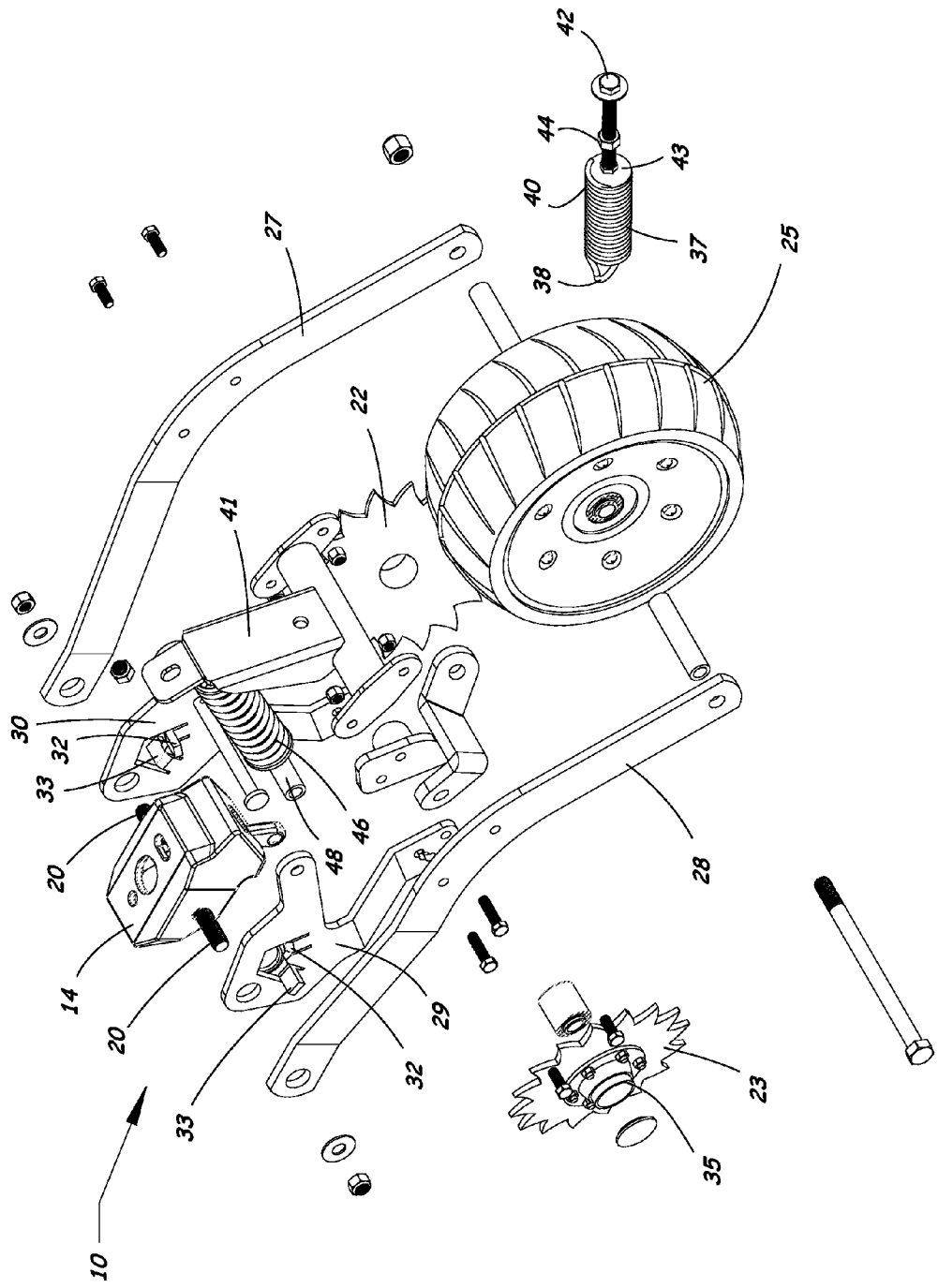
FIG. 10 is an exploded isometric view of the furrow closing assembly shown in FIG. 6.

A furrow closing assembly 10 according to a first embodiment of the invention is illustrated in FIGS. 1 to 10. Referring to FIG. 1, there is shown an isometric view of a planter row unit 11 equipped with the furrow closing assembly 10 of the present invention. FIGS. 2 to 5 show additional views of the planter row unit 11, including a side elevation view in FIG. 2, a side elevation view with partial cutaway in FIG. 3, a bottom view in FIG. 4, and a rear view in FIG. 5. An agricultural planter may have a plurality of such planter row units 11 mounted on a conventional tool bar or a towed implement in a known manner.

The planter row unit 11 includes a seed hopper 12 with a seed metering mechanism (not shown), a dry insecticide hopper 13, and a subframe 14. Other arrangements can also be used, such as a central seed delivery system (not shown) that supplies seed to multiple row units. A furrow opener assembly 15 is mounted to a front portion 16 of the subframe 14 for creating a furrow in which seeds can be deposited. The furrow opener assembly 15 includes a pair of opener discs 17 positioned between a pair of gauge wheels 18. The rear portion 19 of the subframe 14 extends behind the furrow opener assembly 15.

A pair of pivot pins 20 protrude laterally outwardly from opposite sides of the rear portion 19 of the subframe 14. The pivot pins 20 are used on conventional John Deere and Kinze planter row units to attach a furrow closing system to the row unit. The furrow closing assembly 10 of the present invention is designed to attach to these existing pivot pins 20 to allow the furrow closing assembly 10 to be easily attached to existing planter row units.

The furrow closing assembly 10 is pivotally mounted to the pivot pins 20 at the rear portion 19 of the row unit subframe 14 to pivot about a generally horizontal, transverse axis relative to the subframe 14. The furrow closing assembly 10 includes a closing wheel assembly 21 with at least one closing wheel 22, 23 for moving soil into the furrow created by the furrow opener assembly 15, and a press wheel assembly 24 with a press wheel 25 for rolling over the soil surface behind the closing wheels 22, 23.

The press wheel assembly 24 includes a press wheel arm assembly 26 having a pair of press wheel arm members 27, 28 pivotally attached to the pivot pins 20. The press wheel arm members 27, 28 are attached to the pivot pins 20 on respective first and second sides of the rear portion 19 of the planter row unit subframe 14 for pivotal movement about a transverse axis of rotation. The press wheel arm members 27, 28 extend rearwardly from the pivot pins 20. The press wheel 25 is rotatably mounted between the rear ends of the press wheel arm members 27, 28. The press wheel 25 is arranged to roll over the soil surface behind the planter row unit subframe 14 and apply pressure to the soil to improve seed-to-soil contact. The press wheel 25 can have a recessed portion about its outer circular periphery to more effectively compress and shape the soil covering the seed furrow.

The closing wheel assembly 21 includes a closing wheel arm assembly 29 having a pair of closing wheel arms 30, 31 with their front ends pivotally attached to the pivot pins 20. The closing wheel arms 30, 31 extend rearwardly from the pivot pins 20. Adjacent to the front ends of each of the closing wheel arms 30, 31 are a first inwardly extending flange 32 and a second outwardly extending flange 33. The first inwardly extending flange 32 is arranged to engage the subframe 14 to limit the lowermost extent of movement of the closing wheel arms 30, 31. The second outwardly extending flange 33 is arranged to engage the press wheel arms 27, 28 to limit the lowermost extent of movement of the press wheel arms 27, 28. The first and second flanges 32, 33 limit the downward extent of movement when the row unit 11 is raised above the soil.

A pair of closing wheels 22, 23 are rotatably coupled with the rear ends of the closing wheel arms 30, 31 by respective closing wheel hubs 34, 35. The closing wheels 22, 23 are arranged to laterally displace soil inwardly by each of the closing wheels 22, 23 toward the opposing closing wheel and thereby fill the furrow into which seeds have been deposited in front of the press wheel 25. The closing wheel arms 30, 31 pivot about the transverse axis of the pivot pins 20 independent of the press wheel arms 27, 28 to allow the press wheel 25 to move vertically relative to the closing wheels 22, 23 during operation.

The closing wheels 22, 23 in the illustrated embodiment are spoked wheels that have a plurality of spokes extending outwardly from the outer circumference thereof. However, it should be understood that the closing wheels 22, 23 can have various other shapes and configurations, such as spoked or toothed wheels, straight or concave discs, smooth wheels, a single closing disc, and so forth.

A first down-force system 36 is arranged between the subframe 14 and a point on the furrow closing assembly 10 for biasing the furrow closing assembly 10 in a downward direction against the soil surface. The first down-force system 36 illustrated in FIGS. 1 to 10 is a coiled tension spring 37 having a first end 38 connected to an attachment point 39 on the subframe 14 located below and spaced from the pivot pins 20. A second end 40 of the tension spring 37 is connected to a positioning bracket 41 attached between the press wheel arms 27, 28 rearward of the pivot pins 20. The positioning bracket 41 can be attached to the press wheel arms 27, 28, for example, by weldments. The tension spring 37 operates to impart a down force to the press wheel arm assembly 26.

The tension spring 37 is connected to the bracket 41 by a threaded bolt 42. One end of the threaded bolt 42 is connected to the tension spring 37 and the other end of the bolt 42 is connected to the bracket 41. For example, a threaded receiver 43 can be fixed in an end of the tension spring 37, and the bolt 42 can extend through a hole in the bracket 41 and be coupled with the threaded receiver 43. The effective length of the bolt 42 can be adjusted by rotating the bolt 42 or by rotating a threaded nut 44 on the bolt. The down force imparted on the press wheel arm assembly 26 by the tension spring 37 is adjustable by changing the effective length of the bolt 42. For example, by shortening the effective length of the bolt 42, the tension spring 37 will be elongated causing an increased down force to be applied through the positioning bracket 41 to the press wheel arm assembly 26. By lengthening the effective length of the bolt 42, the tension spring 37 will be contracted causing a decreased down force to be applied to the press wheel arm assembly 26. The nut 44 can be used as a jam nut to lock the tension spring 37 in its adjusted position.

A second down-force system 45 is arranged between the press wheel arm assembly 26 and the closing wheel arm assembly 29 for transferring down force between the closing wheels 22, 23 and the press wheel 25. The second down-force system 45 illustrated in FIGS. 1 to 10 is a coiled compression spring assembly. The compression spring assembly 45 includes a compression spring 46 and an elongate threaded member 47 extending through the compression spring 46. A first end of the threaded member 47 extends through a hole in the bracket 41 attached between the press wheel arms 27, 28, and a second end of the threaded member 47 is connected to a pin 48 on the closing wheel arm assembly 29 spaced from the pivot pins 20. The compression spring 46 pushes against the bracket 41 and the closing wheel arm assembly 29 to transfer some of the down force from the press wheel arm assembly 26 to the closing wheel arm assembly 29.

The down force imparted on the closing wheel arm assembly 29 by the compression spring 46 is adjustable by changing the effective length of the spring 46. For example, a threaded adjustment nut 49 on the end of the threaded member 47 can be rotated to change the length of the spring 46 and/or the amount of preload on the spring 46. The amount of down force transferred from the press wheel arm assembly 26 to the closing wheel arm assembly 29 can be adjusted by using the threaded nut 49 to change the length and/or the amount of preload on the compression spring 46 in a continuous manner. For example, tightening the nut 49 on the threaded member 47 will increase the amount of down force applied by the compression spring 46 on the closing wheel arm assembly 29. Adjusting the down force on the closing wheel arm assembly 29 allows the depth of the closing wheels 22, 23 in the soil to be precisely adjusted.

The amount of down force transferred by the compression spring 46 can also be adjusted by providing multiple mounting locations (not shown) for attaching the spring 46 on the closing wheel arm assembly 29. For example, by attaching the compression spring 46 to different mounting locations on the closing wheel arm assembly 29, the length and/or preload on the compression spring 46 can be changed in an incremental manner as desired.

Figure 11:
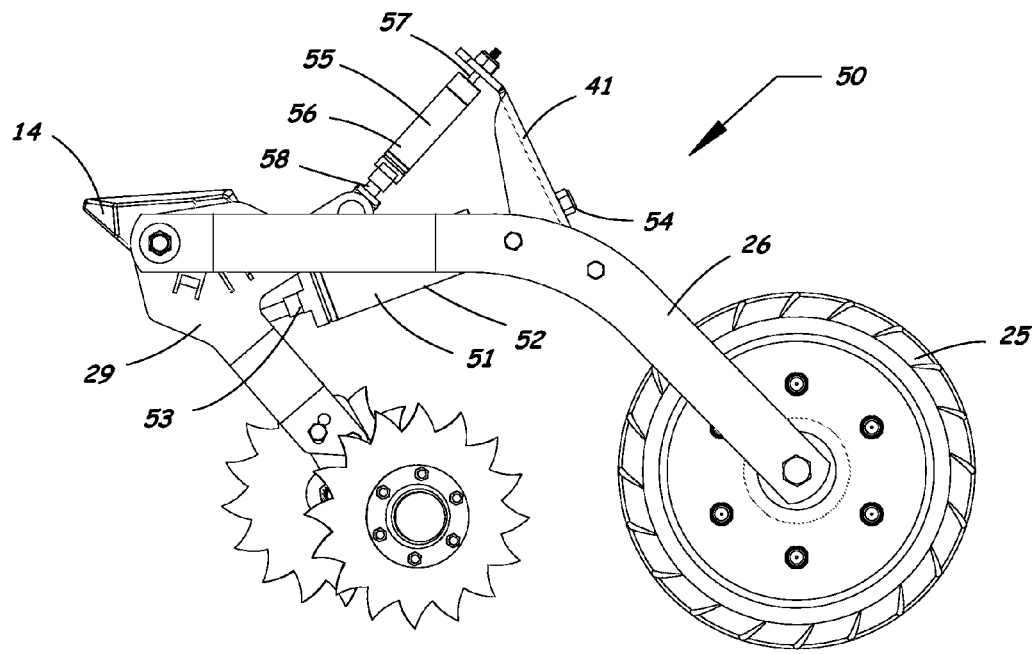
FIG. 11 is a side elevation view of a furrow closing assembly according to a second embodiment of the present invention.
Figure 12:
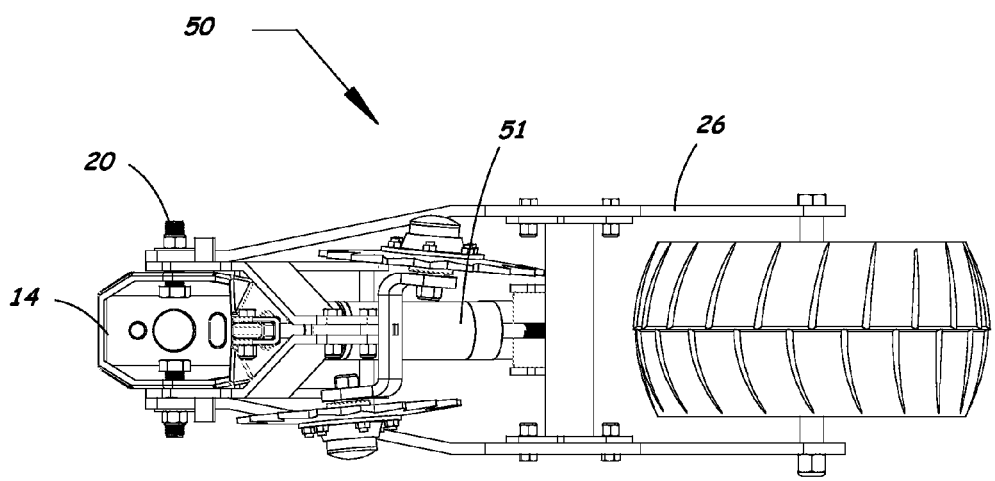
FIG. 12 is a bottom view of the furrow closing assembly shown in FIG. 11.
Figure 13:
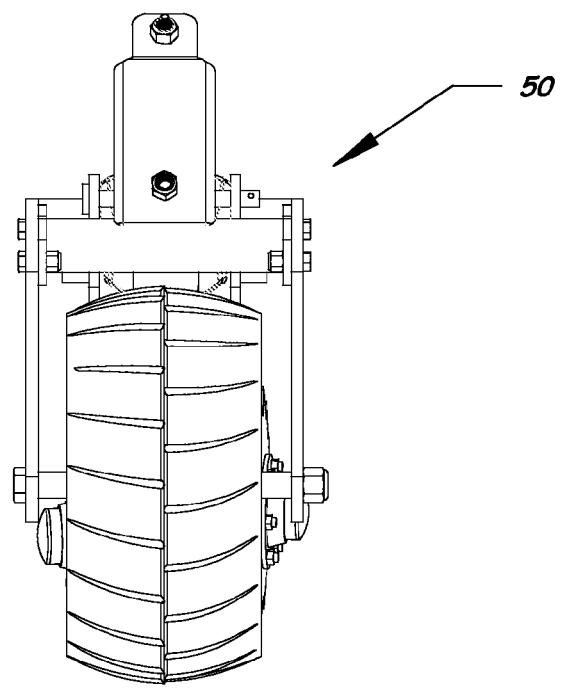
FIG. 13 is a rear view of the furrow closing assembly shown in FIG. 11.
Figure 14:
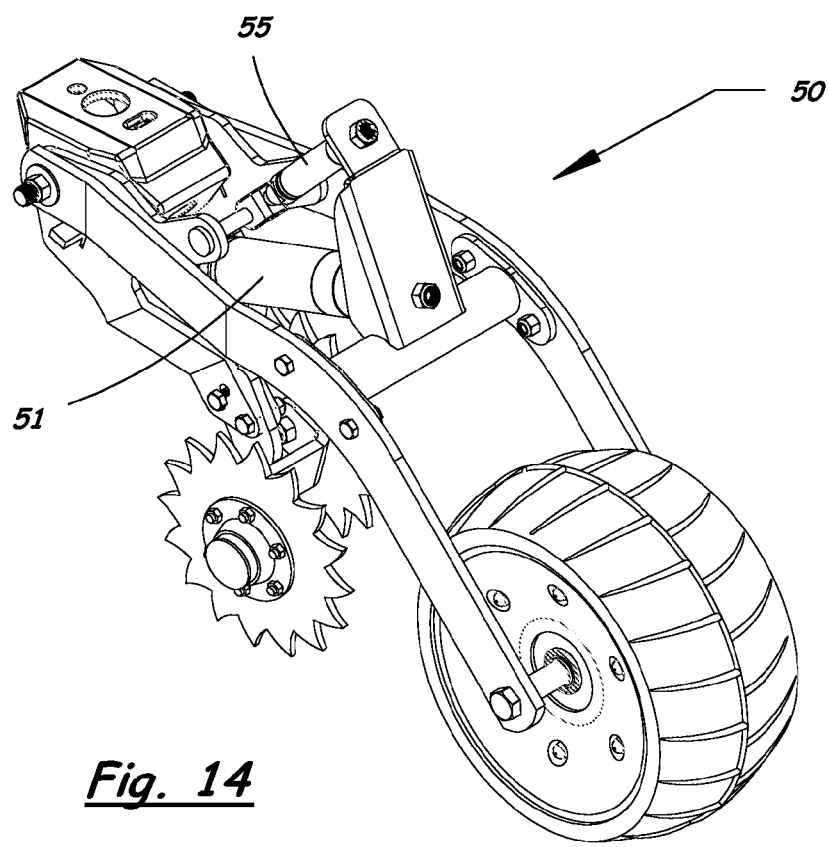
FIG. 14 is an isometric view of the furrow closing assembly shown in FIG. 11.

A furrow closing assembly 50 according to a second embodiment of the invention is illustrated in FIGS. 11 to 14. Referring to FIG. 11, there is shown a front elevation view of a furrow closing assembly 50 of the present invention. FIGS. 12 to 14 show additional views of the furrow closing assembly 50, including a bottom view in FIG. 12, a rear view in FIG. 13, and an isometric view in FIG. 14. The same element numbers used in identifying various components of the first embodiment of the present invention shown in FIGS. 1-10 are also used in identifying individual elements of the second embodiment of the invention shown in FIGS. 11 to 14.

The furrow closing assembly 50 of the second embodiment is similar to the furrow closing assembly 10 of the first embodiment, except that the first and second down-force systems are different. The first down-force system 51 in the second embodiment includes a first actuator 52 that can be operated remotely, such as a hydraulic actuator, a pneumatic actuator, or an electric actuator. For example, the first actuator 52 can be a hydraulic or pneumatic actuator having a first end 53 connected to an attachment point on the subframe 14, and a second end 54 connected to the positioning bracket 41 on the press wheel arm assembly 26. The first actuator 52 is thus connected in a manner similar to the tension spring 37 of the first embodiment.

The first actuator 52 provides a means for adjusting the first down-force system 51 remotely to change an amount of down force imparted thereby. The first actuator 52 can be extended and/or retracted by selectively increasing or decreasing an amount of pressure supplied through a pressure line to the first actuator 52. The amount of pressure supplied to the first actuator 52 will also determine how much down force is imparted to the press wheel arm assembly 26. A plurality of furrow closing assemblies 50 on an agricultural planter can be adjusted simultaneously by connecting the first actuators 52 in parallel to a common pressure source and using an in-cab control system to vary the pressure to the first actuators 52.

The second down-force system 55 in the second embodiment includes a second actuator 56 that can be operated remotely, such as a hydraulic actuator, a pneumatic actuator, or an electric actuator. For example, the second actuator 56 can be a hydraulic or pneumatic actuator having a first end 57 connected to the positioning bracket 41 on the press wheel arm assembly 26, and a second end 58 connected to the closing wheel arm assembly 29. The second actuator 56 is thus connected in a manner similar to the compression spring 46 of the first embodiment.

The second actuator 56 provides a means for adjusting the second down-force system 55 remotely to change an amount of down force imparted thereby. The second actuator 56 can be extended and/or retracted by selectively increasing or decreasing an amount of pressure supplied through a pressure line to the actuator 56. The amount of pressure supplied to the second actuator 56 will also determine how much down force is transferred from the press wheel arm assembly 26 to the closing wheel arm assembly 29. A plurality of furrow closing assemblies 50 on an agricultural planter can be adjusted simultaneously by connecting the second actuators 56 in parallel to a common pressure source and using an in-cab control system to vary the pressure supplied to the second actuators 56.

Figure 15:
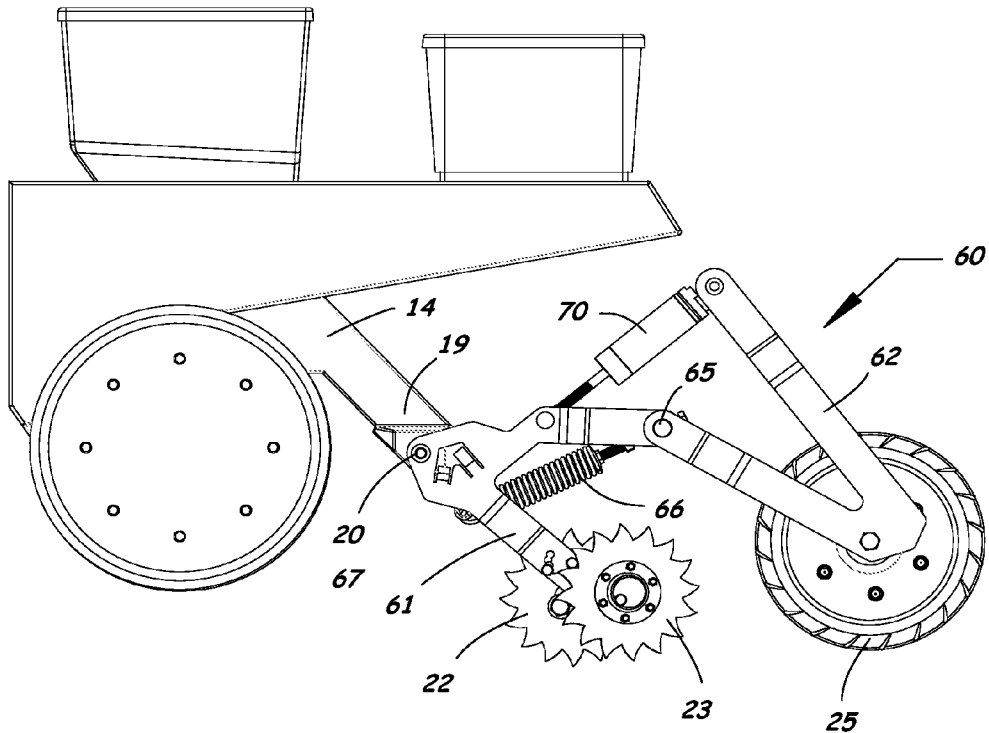
FIG. 15 is a side elevation view of a planter row unit equipped with a furrow closing assembly according to a third embodiment of the present invention.
Figure 16:
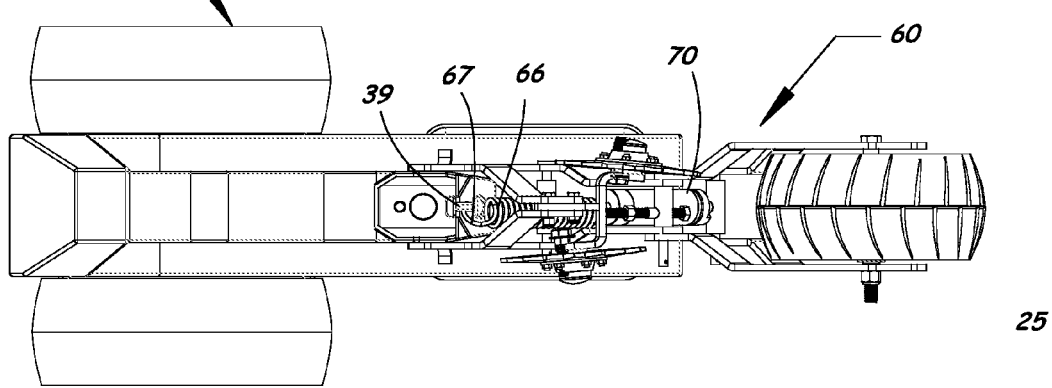
FIG. 16 is a bottom view of the planter row unit shown in FIG. 15.
Figure 17:
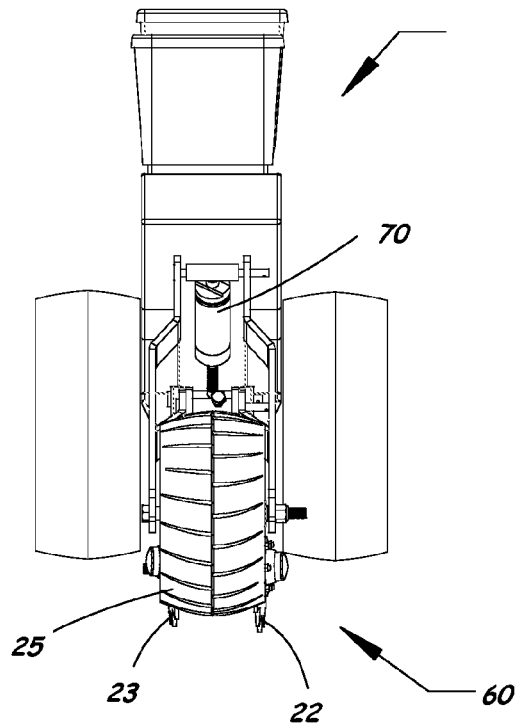
FIG. 17 is a rear view of the planter row unit shown in FIG. 15.
Figure 18:
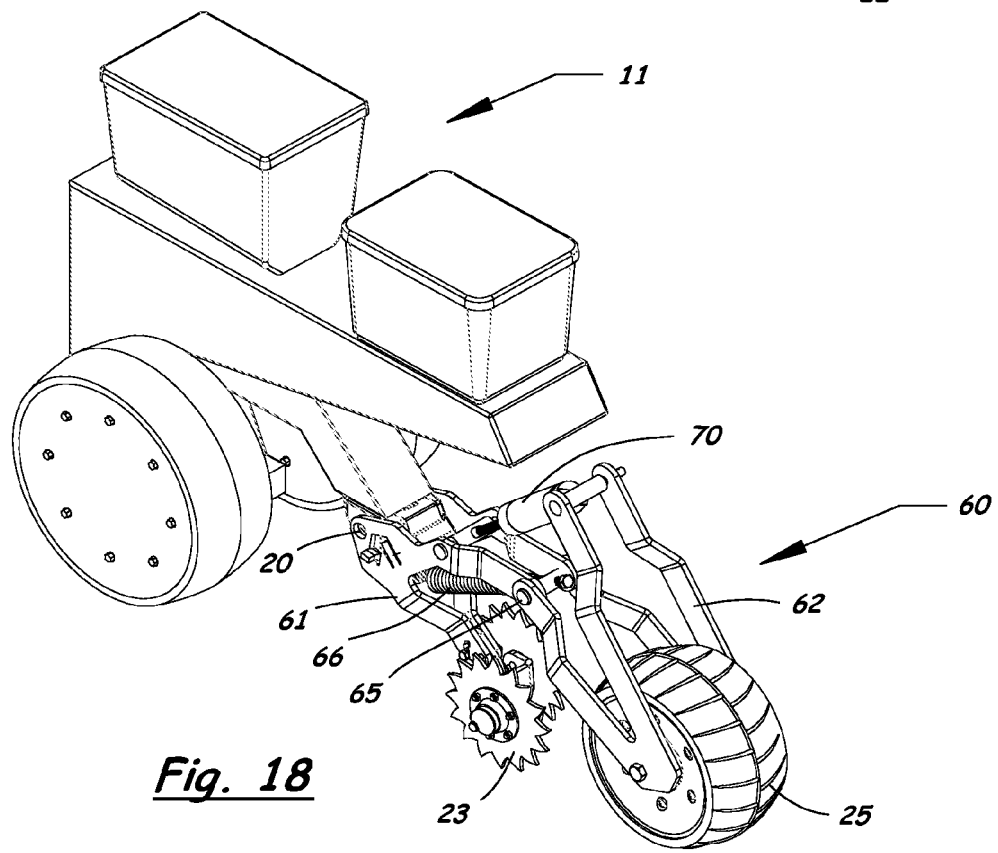
FIG. 18 is an isometric view of the planter row unit shown in FIG. 15.
Figure 19:
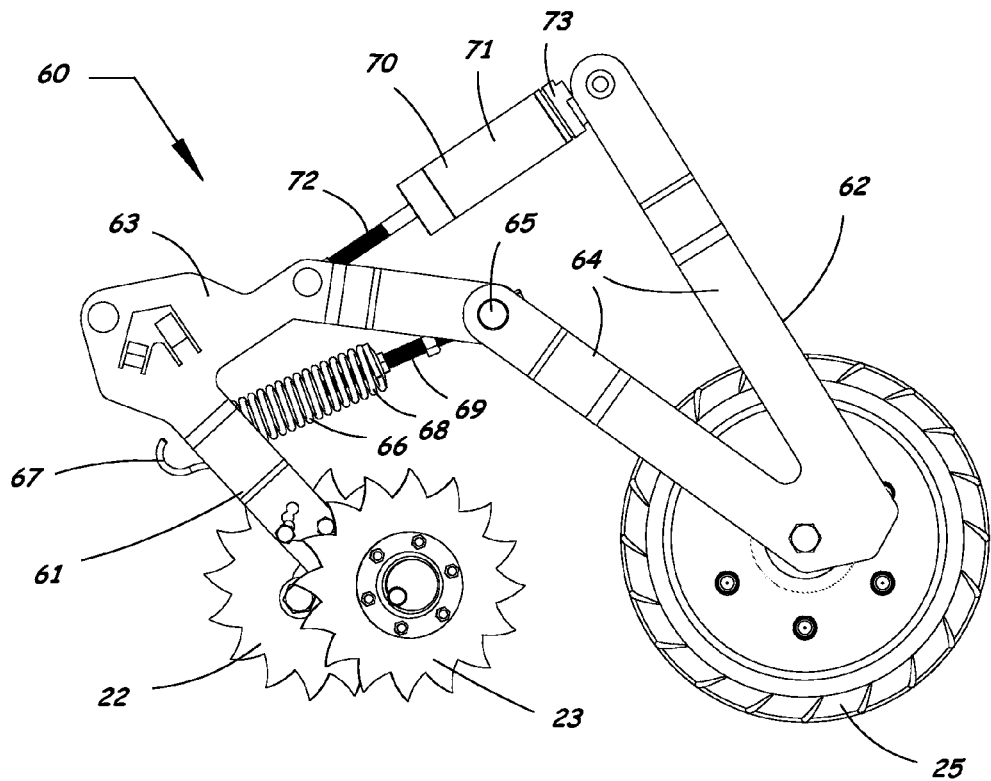
FIG. 19 is a side elevation view of the furrow closing assembly according to the third embodiment of the present invention.
Figure 20:
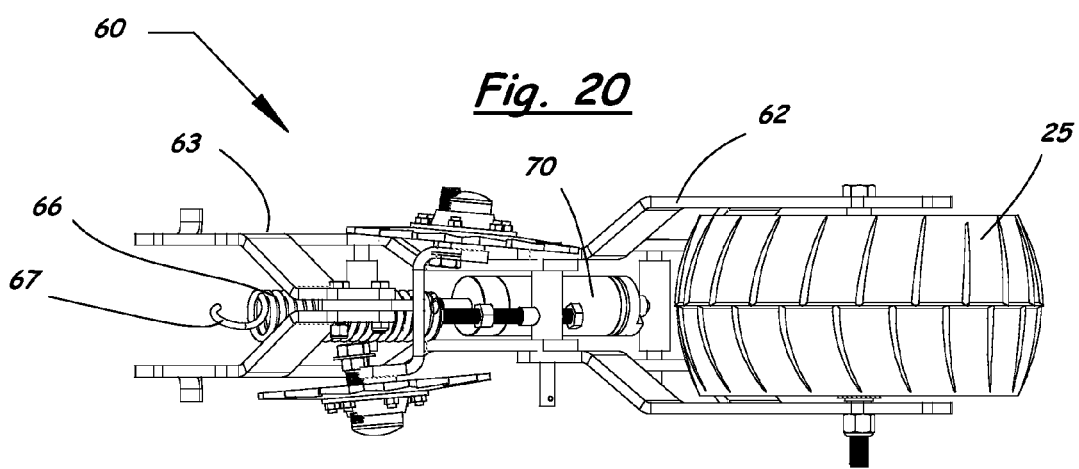
FIG. 20 is a bottom view of the furrow closing assembly shown in FIG. 19.
Figure 21:
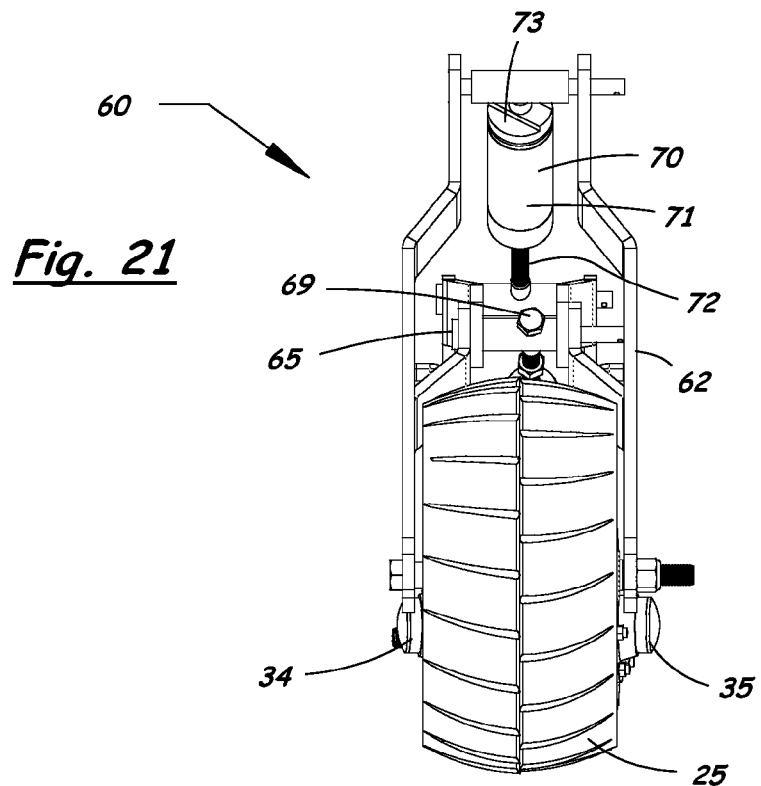
FIG. 21 is a rear view of the furrow closing assembly shown in FIG. 19.
Figure 22:
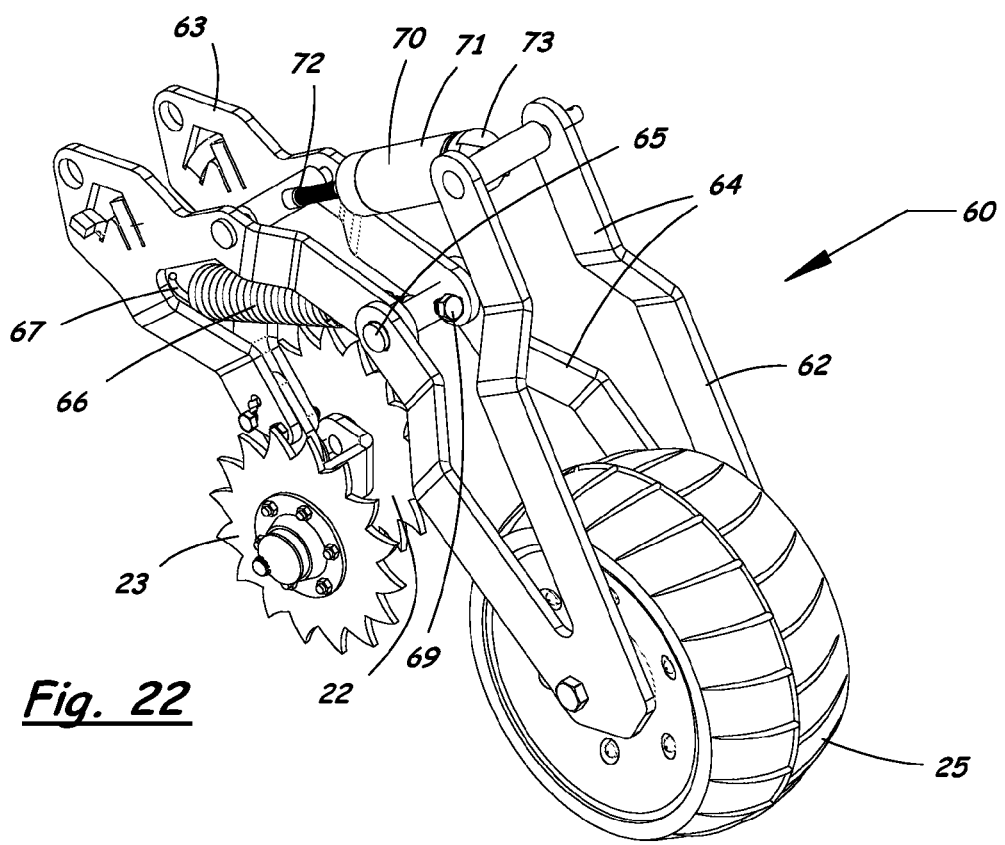
FIG. 22 is an isometric view of the furrow closing assembly shown in FIG. 19.

A furrow closing assembly 60 according to a third embodiment of the invention is illustrated in FIGS. 15 to 22. Referring to FIG. 15, there is shown a side elevation view of a planter row unit 11 equipped with a furrow closing assembly 60 of the present invention. FIGS. 16 to 18 show additional views of the planter row unit 11 equipped with the furrow closing assembly 60, including a bottom view in FIG. 16, a rear view in FIG. 17, and an isometric view in FIG. 18. FIGS. 19 to 22 show various views of the furrow closing assembly 60, including a front elevation view in FIG. 19, a bottom view in FIG. 20, a rear view in FIG. 21, and an isometric view in FIG. 22. The same element numbers used in identifying various components of the first embodiment of the present invention shown in FIGS. 1-10 are also used in identifying individual elements of the third embodiment of the invention shown in FIGS. 15 to 22.

The furrow closing assembly 60 of the third embodiment is similar to the furrow closing assembly 10 of the first embodiment in that it mounts to the existing pivot pins 20 on the rear of the planter row unit subframe 14. This allows the furrow closing assembly 60 to be easily attached and retrofitted to a large number of existing agricultural planters.

The closing wheel assembly 61 and press wheel assembly 62 are different in the furrow closing assembly 60 of the third embodiment. The closing wheel arms 63 are pivotally attached to the existing pivot pins 20 on the rear of the planter row unit subframe 14. However, the press wheel arms 64 are pivotally attached to the closing wheel arms 63, instead of being attached to the pivot pins 20 on the subframe 14 as in the first embodiment. More specifically, the front ends of the press wheel arms 64 are attached to the rear ends of the closing wheel arms 63 using a transverse shaft 65 or other suitable structure that allows relative pivoting movement between the press wheel arms 64 and the closing wheel arms 63.

A first down-force system 66 in the third embodiment includes a tension spring having its first end 67 connected to an attachment point 39 on the subframe 14, and its second end 68 connected to a point on the closing wheel arm assembly 63 rearward of the pivot pins 20. The tension on the tension spring 66 can be adjusted using a threaded bolt 69 or other suitable structure as described above. The first down-force system 66 imparts a down force to the furrow closing assembly 60 through the closing wheel arm assembly 63.

A second down-force system 70 in the third embodiment includes an actuator 71 that can be operated remotely, such as a hydraulic actuator, a pneumatic actuator, or an electric actuator. For example, the actuator 71 can be a hydraulic or pneumatic actuator having a first end 72 connected to the closing wheel arm assembly 63, and a second end 73 connected to the press wheel arm assembly 64. The actuator 71 is arranged to cause the press wheel arm assembly 64 to rotate relative to the closing wheel arm assembly 63 when the actuator 71 is extended or retracted. The actuator 71 provides a means for adjusting the second down-force system 70 remotely to change an amount of down force imparted by the press wheel 25 and the closing wheels 22, 23. For example, extending the actuator 71 will increase an amount of down force on the press wheel 25 while decreasing the amount of down force on the closing wheels 22, 23, and retracting the actuator 71 will decrease the amount of down force on the press wheel 25 while increasing the amount of down force on the closing wheels 22, 23.

The actuator 71 can be extended and/or retracted by selectively increasing or decreasing an amount of pressure supplied through a pressure line to the actuator 71. The amount of pressure supplied to the actuator 61 will also determine how much down force is transferred from the press wheel arm assembly 64 to the closing wheel arm assembly 63. A furrow closing assemblies 60 on an agricultural planter can be operated simultaneously by connecting the actuators 71 in parallel to a common pressure source and using an in-cab control system to vary the pressure to the actuators 71.

Figure 23:
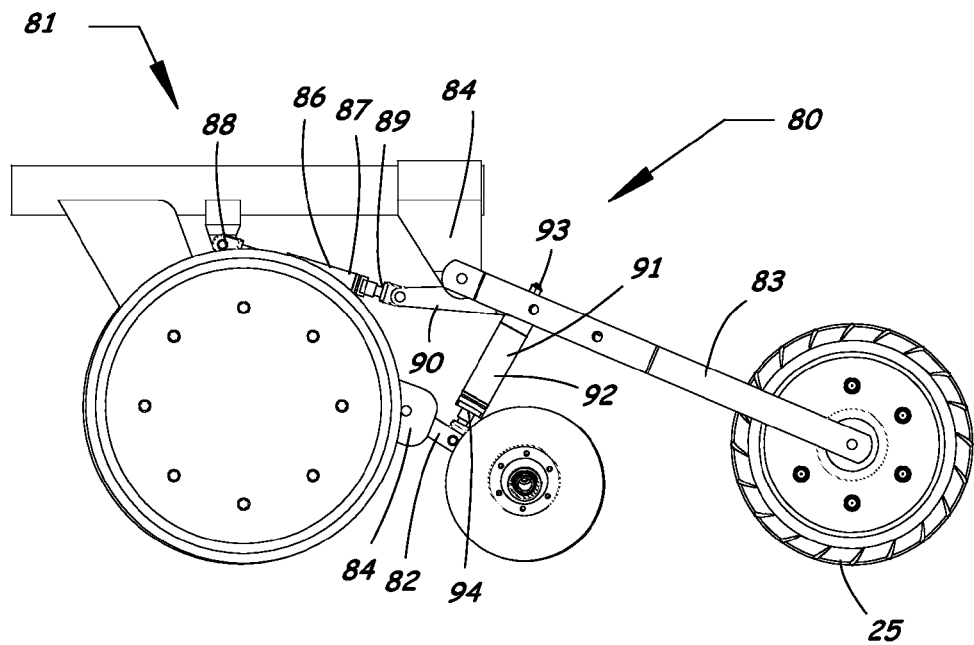
FIG. 23 is a side elevation view of a planter row unit equipped with a furrow closing assembly according to a fourth embodiment of the present invention.
Figure 24:
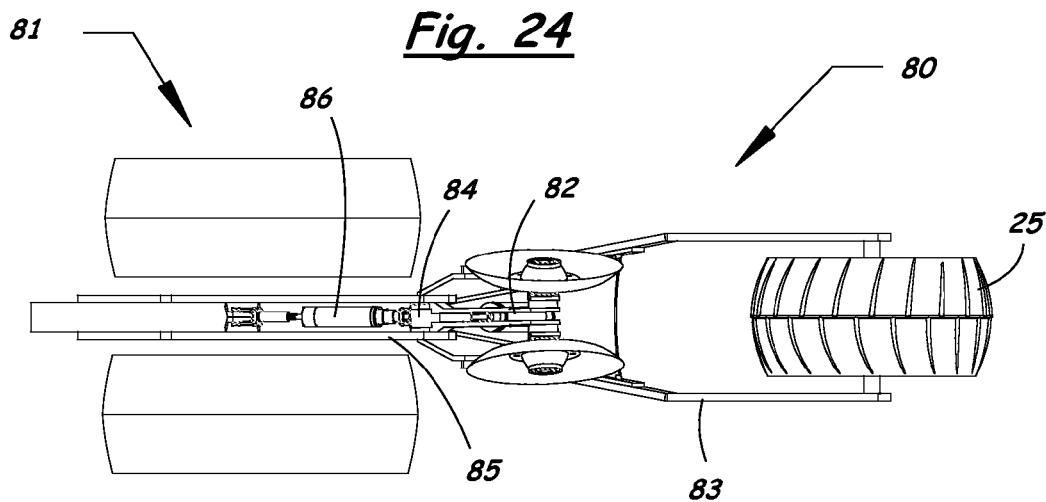
FIG. 24 is a bottom view of the planter row unit shown in FIG. 23.
Figure 25:
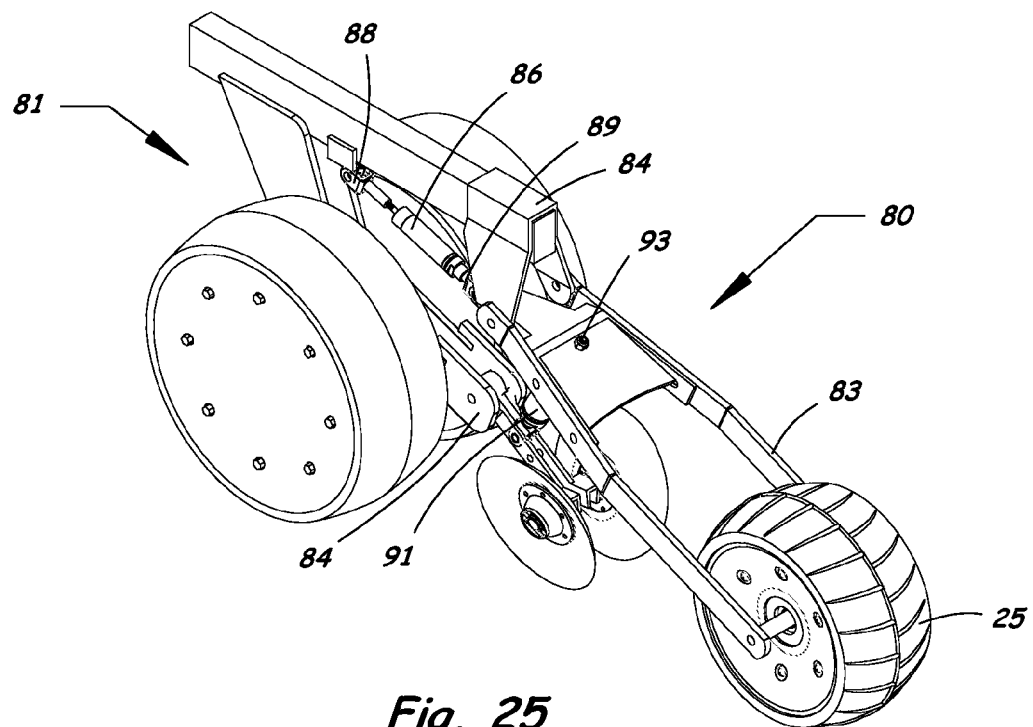
FIG. 25 is an isometric view of the planter row unit shown in FIG. 23.
Figure 26:
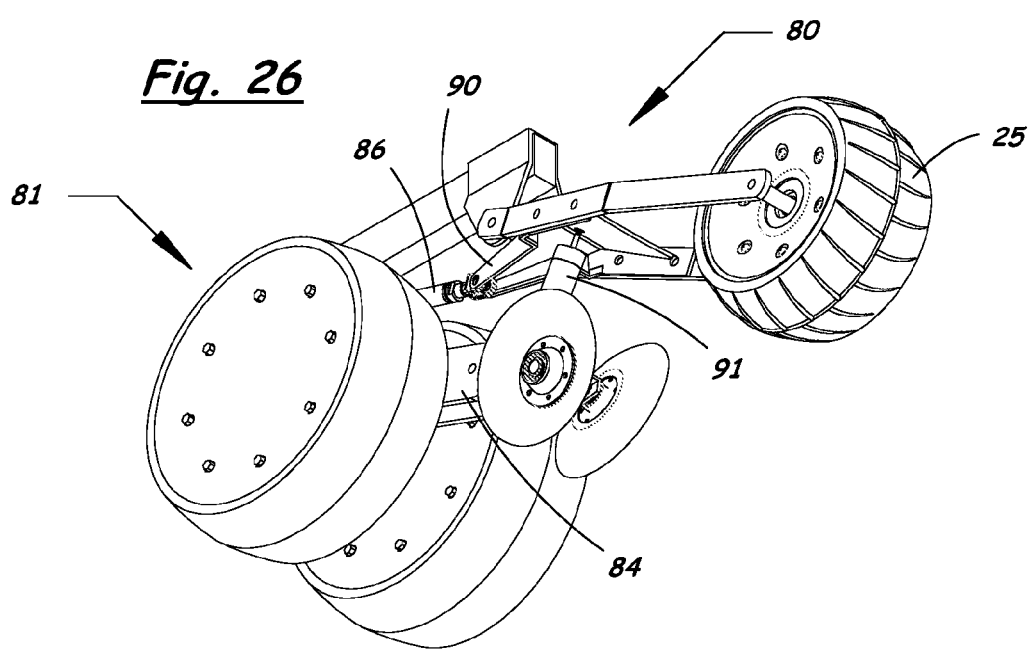
FIG. 26 is another isometric view of the planter row unit shown in FIG. 23.
Figure 27:
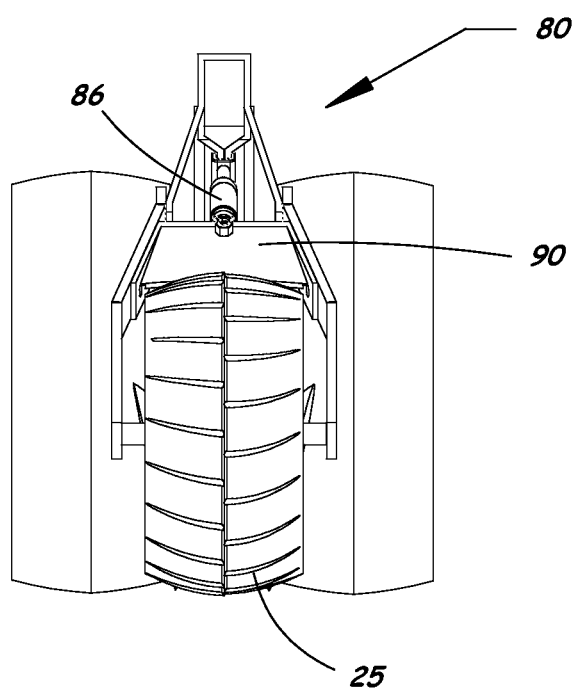
FIG. 27 is a rear view of the planter row unit shown in FIG. 23.

A furrow closing assembly 80 according to a fourth embodiment of the invention is illustrated in FIGS. 23 to 27. Referring to FIG. 23, there is shown a side elevation view of a planter row unit 81 equipped with a furrow closing assembly 80 of the present invention. FIGS. 24 to 27 show additional views of the planter row unit 81 equipped with the furrow closing assembly 80, including a bottom view in FIG. 24, an isometric view in FIG. 25, another isometric view in FIG. 26, and a rear view in FIG. 27.

The furrow closing assembly 80 of the fourth embodiment is designed for use with existing planters that have closing wheel assemblies 82 and press wheel assemblies 83 attached to the row unit subframe 84 at separate locations, such as Case-IH Model 1200 planters. In such planters, a portion of the row unit subframe 84 protrudes rearwardly from a location between the furrow opener discs 85, and the closing wheel assembly 82 is pivotally mounted to that portion of the subframe 84.

The furrow closing assembly 80 of the fourth embodiment is similar to furrow closing assemblies used on existing Case-IH Model 1200 planters, except that the first and second down-force systems are different. The first down-force system 86 in the fourth embodiment includes a first actuator 87 that can be operated remotely, such as a hydraulic actuator, a pneumatic actuator, or an electric actuator. For example, the first actuator 87 can be a hydraulic or pneumatic actuator having a first end 88 connected to an attachment point on the subframe 84, and a second end 89 connected to the positioning bracket 90 on the press wheel assembly 83.

The first actuator 87 provides a means for adjusting the first down-force system 86 remotely to change an amount of down force imparted thereby. The first actuator 87 can be extended and/or retracted by selectively increasing or decreasing an amount of pressure supplied through a pressure line to the first actuator 87. The amount of pressure supplied to the first actuator 87 will also determine how much down force is imparted to the press wheel arm assembly 83. A plurality of furrow closing assemblies 80 on an agricultural planter can be adjusted simultaneously by connecting the first actuators 87 in parallel to a common pressure source and using an in-cab control system to vary the pressure to the first actuators 87.

The second down-force system 91 in the fourth embodiment includes a second actuator 92 that can be operated remotely, such as a hydraulic actuator, a pneumatic actuator, or an electric actuator. For example, the second actuator 92 can be a hydraulic or pneumatic actuator having a first end 93 connected to the positioning bracket 90 on the press wheel arm assembly 83, and a second end 94 connected to the closing wheel arm assembly 82.

The second actuator 92 provides a means for adjusting the second down-force system 91 remotely to change an amount of down force imparted thereby. The second actuator 92 can be extended and/or retracted by selectively increasing or decreasing an amount of pressure supplied through a pressure line to the second actuator 92. The amount of pressure supplied to the second actuator 92 will also determine how much down force is transferred from the press wheel arm assembly 83 to the closing wheel arm assembly 82. A plurality of furrow closing assemblies 90 on an agricultural planter can be adjusted simultaneously by connecting the second actuators 92 in parallel to a common pressure source and using an in-cab control system to vary the pressure to the second actuators 92.

While the invention has been specifically described in connection with specific embodiments thereof, it is to be understood that this is by way of illustration and not of limitation, and the scope of the appended claims should be construed as broadly as the prior art will permit.

What is claimed is:

1. A planter row unit for an agricultural planter, said row unit comprising:
   a row unit subframe having a front portion, a rear portion, and a pair of pivot pins protruding laterally outwardly from opposite sides of said rear portion;
   a furrow opener mounted to the front portion of said subframe for creating a furrow for depositing seeds; and
   a furrow closing assembly comprising:
      a closing wheel rotatably attached to a closing wheel arm assembly and adapted to move soil into a furrow behind said row unit subframe;
      a press wheel rotatably attached to a press wheel arm assembly and adapted to roll over a soil surface behind said closing wheel;
      a front portion of said furrow closing assembly pivotally mounted to said pivot pins for allowing said furrow closing assembly to pivot about a generally horizontal axis relative to said row unit subframe; and
      said press wheel arm assembly and said closing wheel arm assembly being pivotal relative to said row unit subframe and relative to each other to allow relative vertical movement between said closing wheel and said press wheel during operation.

2. The planter row unit according to claim 1, wherein said front portion of said furrow closing assembly comprises respective front ends of said press wheel arm assembly and said closing wheel arm assembly, both of which are pivotally attached to said pivot pins, and wherein said press wheel arm assembly and said closing wheel arm assembly are pivotal relative to each other about said pivot pins.

3. The planter row unit according to claim 1, wherein said front portion of said furrow closing assembly comprises a front end of said closing wheel arm assembly which is pivotally attached to said pivot pins, and wherein said press wheel arm assembly is pivotally mounted to said closing wheel arm assembly rearward of said front end of said closing wheel arm assembly.

4. The planter row unit according to claim 1, wherein said press wheel arm assembly comprises a pair of press wheel arm members pivotally attached to said pivot pins and extending rearwardly therefrom, and wherein said press wheel is rotatably mounted between said press wheel arm members.

5. The planter row unit according to claim 1, wherein said closing wheel comprises a pair of closing disc members rotatably mounted to said closing wheel arm assembly for moving soil into a furrow in front of said press wheel.

6. The planter row unit according to claim 1, further comprising a first down-force system arranged between said row unit subframe and a point on said furrow closing assembly rearward of said pivot pins for biasing said furrow closing assembly downward against the soil surface.

7. The planter row unit according to claim 6, wherein said first down-force system has one end connected to said row unit subframe and the other end connected to a point on said press wheel arm assembly rearward of said pivot pins.

8. The planter row unit according to claim 6, wherein said first down-force system has one end connected to said row unit subframe and the other end connected to a point on said closing wheel arm assembly rearward of said pivot pins.

9. The planter row unit according to claim 6, wherein said first down-force system is adjustable for changing an amount of down force imparted to said furrow closing assembly.

10. The planter row unit according to claim 9, wherein said first down-force system comprises a coil spring, a hydraulic actuator, a pneumatic actuator, or an electric actuator.

11. The planter row unit according to claim 6, further comprising a second down-force system arranged between said press wheel arm assembly and said closing wheel arm assembly for transferring down force between said closing wheel and said press wheel.

12. The planter row unit according to claim 11, wherein said second down-force system has one end connected to a point on said press wheel arm assembly and the other end connected to a point on said closing wheel arm assembly.

13. The planter row unit according to claim 11, wherein said second down-force system is adjustable for changing an amount of down force imparted to said closing wheel and said press wheel, respectively.

14. The planter row unit according to claim 13, wherein said second down-force system comprises a coil spring, a hydraulic actuator, a pneumatic actuator, or an electric actuator.

15. A planter row unit for an agricultural planter, comprising:
    a planter row unit subframe having a front portion, a rear portion and a pair of pivot pins protruding laterally outwardly from opposite sides of said rear portion;
    a furrow opener mounted to the front portion of said subframe for creating a furrow in which seeds can be deposited; and
    a furrow closing assembly comprising:
        a press wheel arm assembly having a front end pivotally attached to said pivot pins for pivotal movement about a transverse axis of rotation;
        a press wheel rotatably attached to a rear end of said press wheel arm assembly and arranged to roll over a soil surface behind said planter row unit subframe;
        a closing wheel arm assembly having a front end pivotally attached to said pair of pivot pins; and
        at least one closing wheel rotatably attached to said closing wheel arm assembly, said closing wheel being arranged to move soil into a furrow in front of said press wheel.

16. The planter row unit according to claim 15, wherein said press wheel arm assembly comprises a pair of press wheel arm members pivotally attached to said pivot pins on respective first and second sides of said planter row unit subframe, and wherein said press wheel is rotatably mounted between said press wheel arm members.

17. The planter row unit according to claim 16, wherein said at least one closing wheel comprises a pair of closing disc members rotatably mounted to said closing wheel arm assembly.

18. The planter row unit according to claim 15, further comprising a first down-force system arranged between said planter row unit subframe and said press wheel arm assembly for applying down force to said furrow closing assembly.

19. The planter row unit according to claim 18, wherein said first down-force system is adjustable for changing an amount of down force imparted to said furrow closing assembly.

20. The planter row unit according to claim 19, wherein said first down-force system comprises a coil spring, a hydraulic actuator, a pneumatic actuator, or an electric actuator.

21. The planter row unit according to claim 18, further comprising a second down-force system arranged between said press wheel arm assembly and said closing wheel arm assembly for transferring down force between said closing wheel and said press wheel.

22. The planter row unit according to claim 21, wherein said second down-force system is adjustable for changing an amount of down force imparted to said closing wheel and said press wheel, respectively.

23. The planter row unit according to claim 22, wherein said second down-force system comprises a coil spring, a hydraulic actuator, a pneumatic actuator, or an electric actuator.

24. A planter row unit for an agricultural seeder, comprising:
    a row unit subframe having a front portion, a rear portion and a pair of pivot pins protruding laterally outwardly from opposite sides of said rear portion;
    a furrow opener mounted to the front portion of said subframe for creating a furrow in which seeds can be deposited; and
    a furrow closing assembly pivotally mounted to said pivot pins to pivot about a generally horizontal axis relative to said subframe, said furrow closing assembly comprising:
        at least one closing wheel rotatably attached to a closing wheel arm assembly and adapted to move soil into the furrow created by said furrow opener;
        a press wheel rotatably attached to a press wheel arm assembly and adapted to roll over a soil surface behind said closing wheel; and
        said press wheel arm assembly and said closing wheel arm assembly being pivotal relative to said subframe and relative to each other to allow relative vertical movement between said closing wheel and said press wheel during operation.

25. The planter row unit according to claim 24, wherein respective front ends of said press wheel arm assembly and said closing wheel arm assembly are pivotally attached to said pivot pins, and wherein said press wheel arm assembly and said closing wheel arm assembly are pivotal relative to each other about said pivot pins.

26. The planter row unit according to claim 24, wherein said closing wheel arm assembly is pivotally attached to said pivot pins, and wherein said press wheel arm assembly is pivotally mounted to said closing wheel arm assembly rearward of said pivot pins.

27. The planter row unit according to claim 24, further comprising a first down-force system arranged between said row unit subframe and a point on said furrow closing assembly rearward of said pivot pins for biasing said furrow closing assembly downward against the soil surface.

28. The planter row unit according to claim 27, wherein said first down-force system has one end connected to said row unit subframe and the other end connected to a point on said press wheel arm assembly rearward of said pivot pins.

29. The planter row unit according to claim 27, wherein said first down-force system has one end connected to said row unit subframe and the other end connected to a point on said closing wheel arm assembly rearward of said pivot pins.

30. The planter row unit according to claim 27, wherein said first down-force system is adjustable for changing an amount of down force imparted to said furrow closing assembly.

31. The planter row unit according to claim 30, wherein said first down-force system comprises a coil spring, a hydraulic actuator, a pneumatic actuator, or an electric actuator.

32. The planter row unit according to claim 27, further comprising a second down-force system arranged between said press wheel arm assembly and said closing wheel arm assembly for transferring down force between said closing wheel and said press wheel.

33. The planter row unit according to claim 32, wherein said second down-force system has one end connected to a point on said press wheel arm assembly and the other end connected to a point on said closing wheel arm assembly.

34. The planter row unit according to claim 32, wherein said second down-force system is adjustable for changing an amount of down force imparted to said closing wheel and said press wheel, respectively.

35. The planter row unit according to claim 34, wherein said second down-force system comprises a coil spring, a hydraulic actuator, a pneumatic actuator, or an electric actuator.

* * * * *